Figure 1:
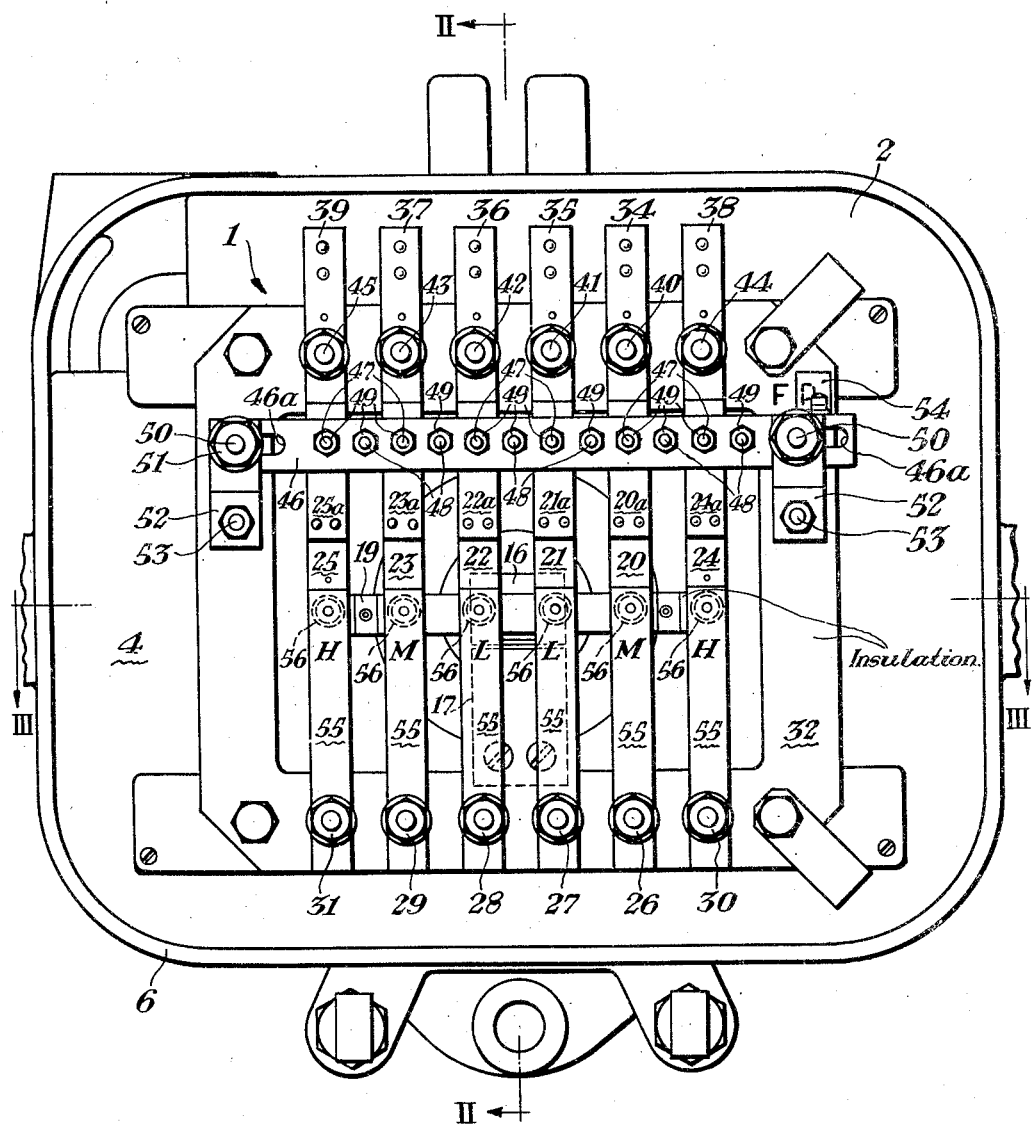

July 14, 1953  H. L. BONE  2,645,686
CIRCUIT CONTROLLER CONTACT ASSEMBLY
Original Filed Sept. 30, 1948  2 Sheets-Sheet 2

INVENTOR.
Herbert L. Bone.
BY
HIS ATTORNEY

Patented July 14, 1953

2,645,686

UNITED STATES PATENT OFFICE 2,645,686

CIRCUIT CONTROLLER CONTACT ASSEMBLY

Herbert L. Bone, Forest Hills, Pa., assignor to Westinghouse Air Brake Company, a corporation of Pennsylvania Original application September 30, 1948, Serial No. 52,095. Divided and this application April 28, 1951, Serial No. 223,623

6 Claims. (Cl. 200—18)

My invention relates to circuit controllers, and particularly to a circuit controller contact assembly for use in a speed responsive device adapted for locomotive use.

The present application is a division of my copending application, Serial No. 52,095, filed September 30, 1948, for Speed Responsive Devices, now U. S. Patent No. 2,361,025 issued March 10, 1953.

Speed responsive devices are incorporated in train control systems and act in conjunction with the cab signaling system to control the air brake system of a train. The cab signaling system provides visual cab signals of the traffic conditions ahead of the train, while the speed responsive device enforces obedience to changes in the cab signal indications which reqquire a reduction in train speed. Locomotive speed responsive devices normally comprise a governor operated in response to locomotive speed and a set of electrical contacts sequentially actuated by the push rod of the governor in accordance with governor speed. The governor contacts are connected into the electrical circuit of the cab signaling system and are each individually adjusted so as to be actuated by the governor at predetermined speeds of the locomotive. The actuation of a particular electrical contact at a predetermined speed which is in excess of the speed permitted by the cab signals, will provide a visual or audible warning signal. An acknowledgment of the warning signal within a specified time by a suitable reduction in the speed of the train will cut off the warning signal. Should the warning go unheeded, the continued actuation of the electrical contact by the governor will cause the brakes to be applied automatically to stop the train.

Since the braking distances of fast passenger trains are different than those of freight trains, the speed limits set into governing devices heretofore used were either for passenger or for freight service. The locomotives equipped with the prevalent governing devices are accordingly used exclusively in passenger service or exclusively in freight service. When any locomotive so equipped is to be used in service other than that set into the governor device, the governor device is either replaced by one set for the particular service, or the individual electrical contacts of the particular governor device are reset for the particular service requirements.

An object of my invention is to provide a circuit controller contact assembly for a speed responsive device in which means are incorporated for setting two different speed schedules at which the speed responsive device is to perform a series of control functions and in which means are provided for selecting a particular speed schedule.

I accomplish the foregoing and other objects of my invention by providing a plurality of electrical contacts which are operated sequentially at low, medium, and high speeds by a speed responsive device. Each contact comprises a movable contact finger arranged to be moved by a push rod of the speed responsive device and a cooperating stationary contact finger. The contact fingers of each pair are biased toward each other so that the fingers engage. As the speed increases, the movable fingers are moved away from the stationary fingers by the push rod of the speed responsive device. The stationary fingers follow the movable contact fingers at first, but this following movement of the stationary fingers is limited by a novel adjustable stop mechanism. This stop mechanism includes a bracket spanning all the stationary fingers and carrying two groups of set screws. The first group of set screws is aligned with the laterally spaced contact fingers while the second group of set screws lies between them. By shifting the bracket endwise, the second group of set screws may be aligned with the cooperating contact fingers, while the first group of set screws is moved aside. The bracket is mounted on a stationary support so as to be readily adjustable endwise. The bracket may be locked in either position, so that adjustment of any set screw can be made when the bracket is stationary. Each group of set screws determines a schedule of speeds at which the contacts are opened by the speed responsive device. Each individual set screw independently determines the speed at which one particular contact is opened in one particular schedule.

Other objects and characteristic features of the invention will appear as the specification progresses.

I shall describe one form of a circuit controller contact assembly embodying my invention, and shall then point out the novel features thereof in claims.

Figure 2:
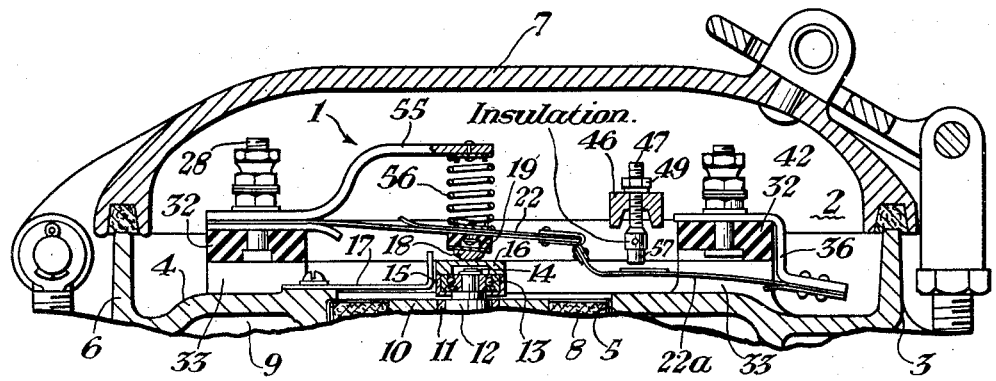
Figure 3:
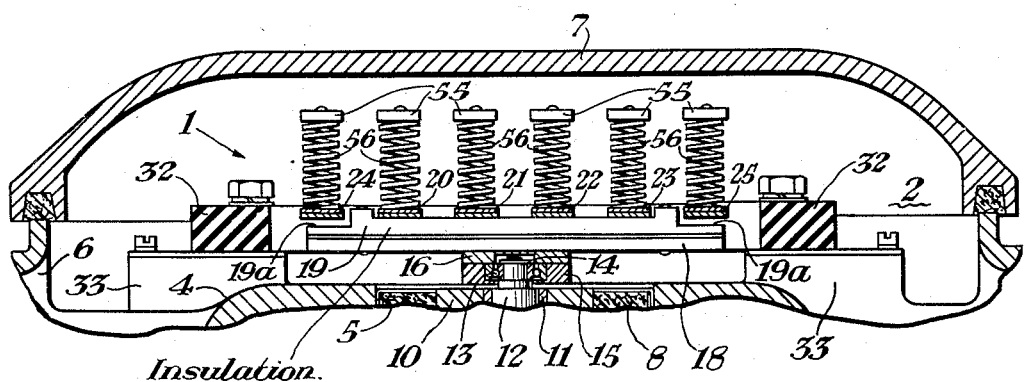

In the drawings, Fig. 1 is a plan view of the contact structure embodying my invention, the contact structure forming a part of a speed responsive device illustrated and described in my aforesaid copending application. Fig. 2 is a cross-sectional view of the device of Fig. 1 taken on the line II—II of Fig. 1, while Fig. 3 is a cross-sectional view of the device taken on line III—III of Fig. 1.

Similar reference characters refer to similar parts in each of the several views.

Referring now in detail to the drawings, the reference numeral 1 generally designates a contact assembly embodying my invention, the contact assembly forming a part of a speed responsive device more fully described and illustrated in my aforesaid copending application. The contact assembly 1 is enclosed in the upper compartment 2 of a two-part housing 3 adapted to be secured to a journal box (not shown). The upper compartment 2 comprises a partition or bottom wall 4 apertured as at 5, housing walls 6 and a removable cover 7. Received within the aperture 5 of the bottom wall are an oil seal 8 sealing off the lower compartment 9 of the housing enclosing the centrifuge members (not shown) and a rotor portion 10 more fully described in my aforesaid copending application. Received within the rotor portion 10 is a bushing 11 forming a bearing for a push rod 12, the push rod extending into the centrifuge member compartment 9 and being adapted to be moved longitudinally by the said centrifuge members upon operation thereof in response to rotational movement.

The upper end of the push rod 12 is provided with an antifriction thrust bearing 13. The inner race of the bearing 13 is secured to the reduced end of push rod 12 by means of a snap ring 14. The outer race of bearing 12 is secured within a rectangular bearing housing 15 having a top plate 16 covering the end of the bearing. The housing 15 is held against rotation by a bearing stop 17 in the form of an L-shaped plate fastened to the bottom wall 4. The top plate 16 engages a hardened steel bar 18 (see Fig. 2) secured to an insulating member 19 which latter in turn is riveted to a plurality of movable contact fingers 20, 21, 22 and 23, respectively. These movable contact fingers and two additional fingers 24 and 25 are secured by means of terminal posts 26, 27, 28, 29, 30 and 31, respectively, to an insulating support 32 attached to bosses 33 formed on the bottom wall 4. The movable contact fingers 20 to 25 cooperate with fixed contact fingers 20a to 25a, respectively, to form associated contacts 20—20a to 25—25a. The fixed contact fingers are riveted at their free ends to associated supporting brackets 34, 35, 36, 37, 38 and 39 secured by means of terminal posts 40, 41, 42, 43, 44 and 45 to the insulating support 32.

A shifter bracket 46 is adjustably mounted at its ends on the insulating support 32, and extends at right angles to and spaced from the stationary contact fingers 20a—25a. The shifter bracket 46 carries two groups of set screws 47 and 48. Each of the set screws 47 and 48 is provided with a lock nut 49. The ends of the shifter bracket 46 are slotted, as at 46a, to receive studs 50 which project from the insulating support 32. Lock nuts 51 on the studs 50 retain the shifter bracket 46 in any position to which it is adjusted with reference to the support 32. A pair of angle brackets 52, attached to the support 32 by means of bolts 53, coperate with the studs 50 in supporting and guiding the movement of the shifter bracket 46.

In the aforesaid parent application, the contact assembly 1 is illustrated in conjunction with a centrifugal governor, the contact assembly and the governor forming a speed responsive device for a locomotive. The contact assembly 1, as will hereinafter be more fully described, is adapted to provide two speed schedules for opening the contacts 20—20a to 25—25a in response to the upward movement of the push rod 12 by the centrifuge members. In the description which follows the push rod 12 will be considered as being moved by centrifuge members in response to locomotive speed, it being understood, however, particularly in connection with the appended claims, that locomotive speed and speed schedules are the equivalent of the extent of movement and movement schedules of the push rod 12.

Above the right end of the shifter bracket 46, as it appears in Fig. 1, two letters "F" and "P" are impressed in the upper surface of the support 32 in any suitable manner. The shifter bracket 46 carries on its upper surface a bracket 54 which overlies the letter "P" when the parts are in the position shown in the drawing. The letter "F" is therefore visible when the cover 7 is removed, and indicates that the contact assembly 1 is set to open its respective contacts according to a schedule established for a locomotive in freight service.

By loosening the lock nuts 51, the shifter bracket 46 may be moved endwise to the left from the position shown in the drawing until the studs 50 engage the opposite ends of the slots 46a. The parts are so proportioned that when the bracket 46 is so shifted, the set screws 47 are moved out of alignment with the stationary contacts 20a—25a, and the set screws 48 are moved into alignment with those contacts. At the same time, the bracket 54 moves to uncover the letter "P" and cover the letter "F," thereby indicating that the contact assembly 1 has been set for a schedule of speeds suitable for a locomotive in passenger service.

Each contact finger of each cooperating pair is biased to engage its opposite contact finger. Attached to the terminal posts 26—31 associated with the movable contact fingers are brackets 55, one for each movable contact finger, which brackets extend parallel to and spaced from the contact fingers. Retained between each bracket 55 and its associated movable contact finger is a coil spring 56. These coil springs 56 bias the movable contact fingers toward the stationary contact fingers. The coil springs 56 associated with the four central contact fingers 20, 21, 22, and 23, which are attached to insulating member 19 and steel bar 18, also serve to bias the steel bar 18 into engagement with the bearing top plate 16 on the end of push rod 12.

The flexible stationary contact fingers 20a—25a are self-biased toward their respective movable contact fingers. The proper bias may be established and adjusted in the case of each stationary contact finger by properly bending the ends of the brackets 34 to 39 which support the contact finger. The set screws 47 and 48 carry insulating tips 57 which at times engage the respective stationary contacts 20a—25a and limit their movement toward the movable contact fingers.

The setting of any set screw 47 or 48 determines the extent of movement of the push rod 12 at which its associated pair of contact fingers open. For example, referring to Fig. 2, it may be seen that as the push rod 12 moves upwardly, the point at which the contacts 22—22a separate is determined by the point at which the motion of contact 22a is stopped by the adjustment of set screw 47.

When the shifter bracket 46 is in its "F" position, as shown in the drawings, the speed at which any given contact is opened is determined by the setting of its particular set screw 47. As indicated by the letters L, M, and H in Fig. 1, the contacts 21—21a and 22—22a are arranged to open at a relatively low speed, the contacts 20—20a and 23—23a at a medium speed, and the contacts 24—24a and 25—25a at a high speed. When the shifter bracket 46 is moved to its "P" position, an entirely new and independent schedule of contact opening speeds is then established, which schedule is determined by the setting of the set screws 48 and is entirely independent of the settings established by the set screws 47.

It should be noted that the outer movable contact fingers 24 and 25, which are the high speed contact fingers, are not rigidly attached to the insulating member 19 in the same manner as the other movable contact fingers 20—23. Instead, the member 19 is provided with recesses 19a (see Fig. 3) in alignment with the contact fingers 24 and 25. Because of this construction, the fingers 24 and 25 are engaged and deflected from their normal position only when a certain high speed is reached, approaching the speed at which the contacts 24 and 25 are to be separated from their respective stationary contacts. This construction avoids excessive deflection of the stationary contact fingers 24a and 25a which would occur when the speed responsive device was stationary if the fingers 24 and 25 were rigidly attached to the member 19.

A speed responsive device adapted for locomotive use provided with a contact assembly hereinabove described, may be used in either passenger or freight service as required, the shifter bracket 46 and its associated sets of set screws 47 and 48 providing a readily accessible and adjustable means for changing the speed schedule of operation of the individual contacts of the contact assembly, the contact assembly providing an advantageous and speedy changeover of speed schedules without the formerly required substitution or adjustment of parts.

Although I have herein shown and described only one form of circuit controller contact assembly embodying my invention, it is understood that various changes and modifications may be made therein within the scope of the appended claims without departing from the spirit and scope of my invention.

Having thus described my invention, what I claim is:

1. Control apparatus, comprising a movable member, a plurality of spaced pairs of cooperating first and second flexible contact fingers, each finger being fixed at one end and having its free end overlapping the free end of its associated second finger, said fingers being biased toward each other, a contact operating member positioned by the movable member and extending transversely of said first fingers to move said first fingers away from said second fingers, stop means for limiting the movement of said second fingers toward said first fingers, said stop means comprising a bracket extending transversely of said second fingers, first and second groups of set screws adjustably fastened to said bracket, said first group when aligned with said second fingers establishing a first schedule of movement of said movable member at which said contact fingers separate, said second group of set screws when aligned with said second fingers establishing a second schedule of movement of said movable member at which said contact fingers separate, and means for moving said bracket longitudinally so as to move said groups of set screws selectively into alignment with said second fingers.

2. Control apparatus, comprising a movable member, a plurality of spaced pairs of cooperating first and second flexible contact fingers biased toward each other, said movable member extending transversely of said first fingers to move said first fingers away from said second fingers, stop means for limiting the movement of said second fingers toward said first fingers, said stop means comprising a bracket extending transversely of said second fingers, first and second groups of set screws adjustably fastened to said bracket, said first group when aligned with said second fingers establishing a first schedule of positions of said movable member at which said contact fingers separate, said second group of set screws when aligned with said second fingers establishing a second schedule of positions of said member at which said contact fingers separate, and means for moving said bracket longitudinally so as to move said groups of set screws selectively into alignment with said second fingers.

3. Control apparatus, comprising a movable member, a plurality of spaced pairs of cooperating first and second control elements, said elements being biased toward each other, a connection between said member and said first elements to move said first elements away from said second elements as said member moves in one direction, stop means for limiting the movement of said second elements toward said first elements, said stop means comprising a bracket extending transversely of said second elements, first and second groups of set screws adjustably fastened to said bracket, said first group when aligned with said second elements establishing a first schedule of positions of said movable member at which said pairs of elements separate, said second group of set screws when aligned with said second elements establishing a second schedule of positions of said movable member at which said pairs of elements separate, and means for moving said bracket longitudinally so as to move said groups of set screws selectively into alignment with said second elements.

4. Control apparatus, comprising a movable member, a control element operated between first and second controlling positions by movement of said member, adjusting means including a support, an adjusting member shiftably mounted on the support for movement between first and second positions, and first and second set screw means on the adjusting member for separately establishing the position of said movable member at which said control element is operated in the first and second positions of said adjusting member respectively.

5. Control apparatus, comprising a movable member, a plurality of spaced pairs of cooperating first and second flexible contact fingers, means biasing each said first finger toward its associated second finger, each said second finger being self-biased toward its associated first finger, a contact operating bar positioned by the movable member and extending transversely of said first fingers to move said first fingers away from said second fingers, and stop means for limiting the movement of said second fingers toward said first fingers, said stop means being effective to cause opening of certain pairs of fingers at a predetermined movement of said movable member and of certain other pairs of fingers at a second predetermined movement of said member, said bar having recesses in alignment with the first fingers of said last pairs so that the bar does not engage the first fingers of the said last pairs at the first predetermined movement of said movable member.

6. Control apparatus, comprising a plurality of spaced pairs of engaged contacts biased toward each other, an insulating member fixed to the first contact of each pair of contacts, a movable member cooperating with said insulating member to move said member to disengage said first contacts from said second contacts upon movement thereof by said movable member, a shifter bracket movable into a plurality of positions, a number of limit stops on said shifter bracket for each of said second contacts equal to the number of positions of said shifter bracket, said stops limiting the biased movement of said second contacts with said first contacts as said first contacts are moved by said insulating member to disengage said contacts, each of said limit stops being adjustable to determine the extent of movement of said movable member for disengaging each individual pair of engaged contacts in each position of said shifter bracket.

HERBERT L. BONE.

References Cited in the file of this patent

UNITED STATES PATENTS

| Number | Name | Date |
|---|---|---|
| 2,244,760 | Bone | June 10, 1941 |